(12) United States Patent
Morning-Smith et al.

(10) Patent No.: US 9,857,859 B2
(45) Date of Patent: Jan. 2, 2018

(54) TECHNIQUES TO POWER DOWN OUTPUT POWER RAILS FOR A STORAGE DEVICE

(71) Applicant: Intel Corporation, Santa Clara, CA (US)

(72) Inventors: Andrew Morning-Smith, Vancouver (CA); Kai-Uwe Schmidt, Vancouver (CA); Adrian Mocanu, Langley (CA); Mike M. Ngo, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 14/977,305

(22) Filed: Dec. 21, 2015

(65) Prior Publication Data
US 2017/0177057 A1 Jun. 22, 2017

(51) Int. Cl.
*G06F 1/32* (2006.01)

(52) U.S. Cl.
CPC .......... *G06F 1/3206* (2013.01); *G06F 1/3287* (2013.01)

(58) Field of Classification Search
CPC ........................................................ G06F 1/32
See application file for complete search history.

(56) References Cited

U.S. PATENT DOCUMENTS

| | | | |
|---|---|---|---|
| 9,588,565 B1* | 3/2017 | Harland | G06F 1/28 |
| 2005/0248894 A1* | 11/2005 | Bliley | H02M 3/156 |
| | | | 361/92 |
| 2006/0080515 A1* | 4/2006 | Spiers | G06F 11/1441 |
| | | | 711/162 |
| 2010/0008175 A1 | 1/2010 | Sweere et al. | |
| 2010/0090663 A1* | 4/2010 | Pappas | H01G 9/155 |
| | | | 320/166 |
| 2013/0039141 A1 | 2/2013 | Smith et al. | |
| 2015/0046747 A1* | 2/2015 | Gaertner | G06F 11/1666 |
| | | | 714/6.11 |
| 2015/0198958 A1 | 7/2015 | Galinski | |
| 2015/0248935 A1 | 9/2015 | Moshayedi et al. | |
| 2015/0310886 A1* | 10/2015 | Ferris | G11B 19/047 |
| | | | 360/99.08 |
| 2015/0318027 A1 | 11/2015 | Ellis et al. | |
| 2017/0090538 A1* | 3/2017 | Wang | G11C 5/14 |
| 2017/0168943 A1* | 6/2017 | Chou | G06F 12/0833 |

OTHER PUBLICATIONS

International Search Report and Written Opinion for PCT Patent Application No. PCT/US2016/062477, dated Feb. 28, 2017, 10 pages.

* cited by examiner

*Primary Examiner* — Mohammed Rehman
(74) *Attorney, Agent, or Firm* — Compass IP Law PC

(57) ABSTRACT

Examples include techniques to power down output power rails for a storage device. In some examples, energy discharged from output capacitors for output power rails and energy discharged from input capacitors may be used to facilitate power down of power rails for the storage device.

26 Claims, 8 Drawing Sheets

Power Down Scheme 300

600

DETECT, AT A PROCESSING CIRCUIT, THAT A SOURCE VOLTAGE RECEIVED FROM A POWER SOURCE ARRANGED TO PROVIDE OPERATIONAL POWER TO A STORAGE DEVICE HAS DROPPED BELOW A THRESHOLD VOLTAGE
*602*

CAUSE A FIRST OUTPUT CAPACITOR FOR A FIRST OUTPUT POWER RAIL OF THE STORAGE DEVICE TO DISCHARGE A FIRST ENERGY AWAY FROM A FIRST OUTPUT CAPACITOR AND THROUGH A FIRST VOLTAGE REGULATOR FOR THE FIRST OUTPUT POWER RAIL TO A POWER INPUT FOR THE FIRST OUTPUT POWER RAIL AND ONE OR MORE OTHER OUTPUT POWER RAILS INCLUDING A SECOND OUTPUT POWER RAIL
*604*

COMBINE THE FIRST ENERGY AND A SECOND ENERGY DISCHARGING FROM AN INPUT CAPACITOR FOR THE POWER INPUT, THE COMBINED FIRST AND SECOND ENERGY TO SERVE AS A SECOND POWER SOURCE TO PROVIDE SOURCE POWER TO A SECOND VOLTAGE REGULATOR FOR THE SECOND OUTPUT POWER RAIL TO ENABLE THE SECOND OUTPUT POWER RAIL TO RAMP DOWN POWER PROVIDED TO A SECOND OUTPUT LOAD
*606*

*FIG. 6*

TECHNIQUES TO POWER DOWN OUTPUT POWER RAILS FOR A STORAGE DEVICE

TECHNICAL FIELD

Examples described herein are generally related to techniques for powering down a storage device.

BACKGROUND

Storage devices such as solid state drives (SSDs) may be unique from most other peripheral devices in that SSDs have a need for a controlled shutdown or power down upon power loss. A controlled shutdown or power down may allow for in-flight data to be saved and for voltage rails to be ramped down in an orderly sequence. The controlled shutdown or power down may avoid data corruption or damage to storage media included in an SSD.

BRIEF DESCRIPTION OF THE DRAWINGS

FIG. 6 illustrates an example of a logic flow.

DETAILED DESCRIPTION

As contemplated in the present disclosure, a controlled shutdown or power down of a storage device such as an SSD may avoid data corruption or damage to storage media. Typically, SSDs including types of non-volatile memory such as NAND flash use dedicated circuitry to store and manage energy at a high voltage. This dedicated circuitry typically includes a large bank of hold-up capacitors to support completion of operations and allow for a controlled, orderly power down. The block addressable memory included in NAND flash often requires a relatively long time (several milliseconds) to complete NAND operations during a power down as compared to time to power down output power rails included in these NAND-based SSDs. As a result of this relatively long time to complete NAND operations, a large portion of hold-up energy discharged from hold-up capacitors may be used for completing NAND operations and a comparatively insignificant portion of hold-up energy may be needed to power down output power rails.

SSD including types of non-volatile memory that may be byte addressable types of non-volatile memory may have significantly shorter times to complete operations during a power down compared to NAND-based SSDs. For example, three-dimensional (3-D) cross-point memory may require only a few microseconds to complete operations during power down. The significantly shorter time to complete operations substantially reduces the need for a large bank of hold-up capacitors. However, operation time to ramp down output power rails are relatively constant between NAND-based SSDs and SSDs including 3-D cross-point memory. So in contrast to NAND-based SSDs, shut down energy for powering down output power rails becomes a significant portion of a hold-up or orderly power down energy budget.

Figure 1:
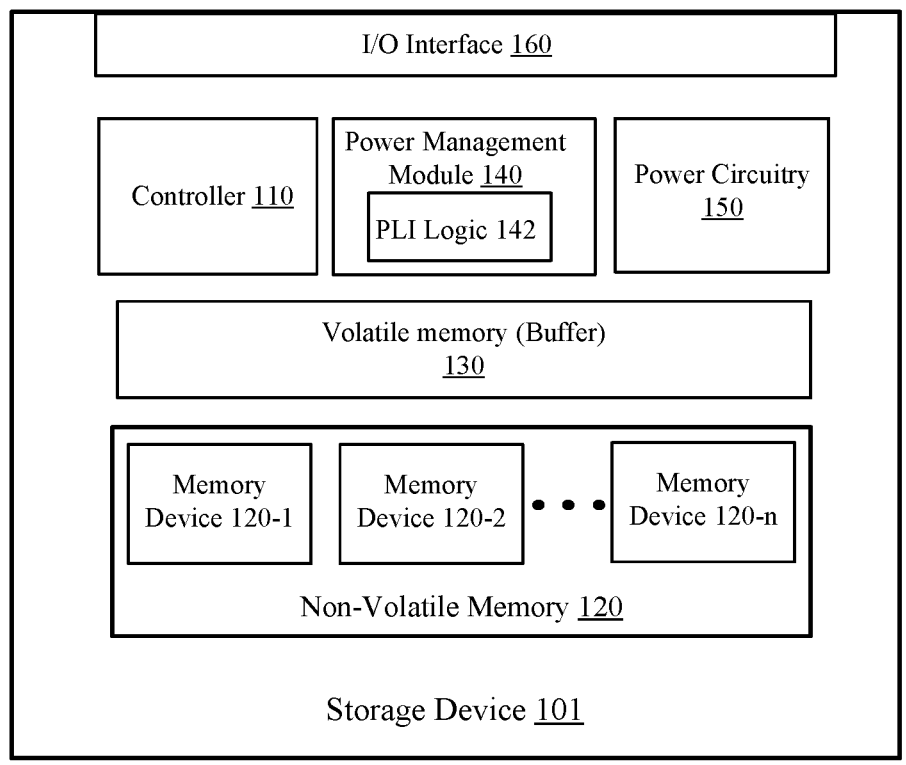
FIG. 1 illustrates an example first system.

FIG. 1 illustrates an example system 100. In some examples, as shown in FIG. 1, system 100 includes a storage device 101. Storage device 101 may include a controller 110, non-volatile memory 120, volatile memory 130, a power management module 140, a power circuitry 150 or an input/output (I/O) interface 160. In some examples, controller 110 may be capable of controlling access to one or more memory devices 120-1 to 120-n, where "n" is any whole positive integer>1. Controller 120 may also utilize volatile memory 130 as a buffer to facilitate access to memory devices 120-1 to 120-n.

According to some examples, as described more below, power management module 140 may include logic and/or features such as a power loss imminent (PLI) logic 142 to utilize certain physical aspects (e.g., input or output capacitors) of power circuitry 150 to provide hold-up energy discharged as a current electrical energy to orderly power down output power rails for storage device 101. These output power rails may be included in power circuitry 150 and the orderly power down may be responsive to detection of a source voltage received from a power source (e.g., battery-based or power outlet-based power) falling below a threshold voltage. The source voltage falling below the threshold voltage (e.g., below an operating voltage of 1.8 volts (V) or 3.3V) may indicate a power loss imminent event that may cause PLI logic 142 to utilize elements of power circuitry 150 to provide hold-up energy to temporarily maintain source voltage to orderly power down output power rails for storage device 101.

In some examples, power management module 140 may be an application specific integrated chip (ASIC) separate from controller 110 (e.g., a power management integrated circuit (PMIC)) for managing power routed through power circuitry 150. In other examples, power management module 140 may be integrated with or located on a same die as controller 140 to manage power routed through power circuitry 150 (e.g., as a system management controller).

In some examples, volatile memory 130 may include volatile types of memory including, but not limited to, random-access memory (RAM), Dynamic RAM (D-RAM), double data rate synchronous dynamic RAM (DDR SDRAM), static random-access memory (SRAM), Thyristor RAM (T-RAM) or zero-capacitor RAM (Z-RAM). Memory devices including volatile types of memory may be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

In some examples, memory devices 120 to 120-n of non-volatile memory 120 may be arranged to store data (e.g., written from a host computing device). Memory devices 120-1 to 120-n may include chips or dies having non-volatile types of memory whose state is determinate even if power is interrupted to the device. In some examples, at least some memory devices of memory devices 120-1 to 120-n may be block addressable memory devices, such as those associated with NAND or NOR technologies. At least some memory devices of memory devices 120-1 to 120-n may also include chips or dies having other non-volatile types of memory such as 3-D cross-point memory that are byte addressable. These block addressable or byte addressable non-volatile types of memory for memory devices 120-1 to 120-*n* may include, but are not limited to, non-volatile types of memory that use chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other non-volatile memory types.

I/O interface 160, in some examples, may be utilized by controller 110 to receive read or write requests to storage device 101 (e.g., received from a computing device). In one example, I/O interface 160 may be arranged as a Serial Advanced Technology Attachment (SATA) interface to couple storage device 101 in communication with a computing platform (e.g., a host computing platform). In another example, I/O interface 160 may be arranged as a Serial Attached Small Computer System Interface (SCSI) (or simply SAS) interface to couple storage device 101 in communication with a computing platform. In another example, I/O interface 160 may be arranged as a Peripheral Component Interconnect Express (PCIe) interface to couple storage device 101 in communication with a computing platform. In another example, I/O interface 160 may be arranged as a Non-Volatile Memory Express (NVMe) interface to couple storage device 101 in communication with a computing platform. For this other example, communication protocols may be utilized to communicate through I/O interface 160 as described in industry standards or specifications (including progenies or variants) such as the universal serial bus (USB) specification, USB 3.1, published in July 2013, the Thunderbolt™ technology, the Peripheral Component Interconnect (PCI) Express Base Specification, revision 3.1, published in November 2014 ("PCI Express specification" or "PCIe specification") and/or the Non-Volatile Memory Express (NVMe) Specification, revision 1.2, also published in November 2014 ("NVMe specification"). I/O interface 160 may also be arranged as a parallel interface such as may be utilized for a non-volatile DIMM.

Figure 2:
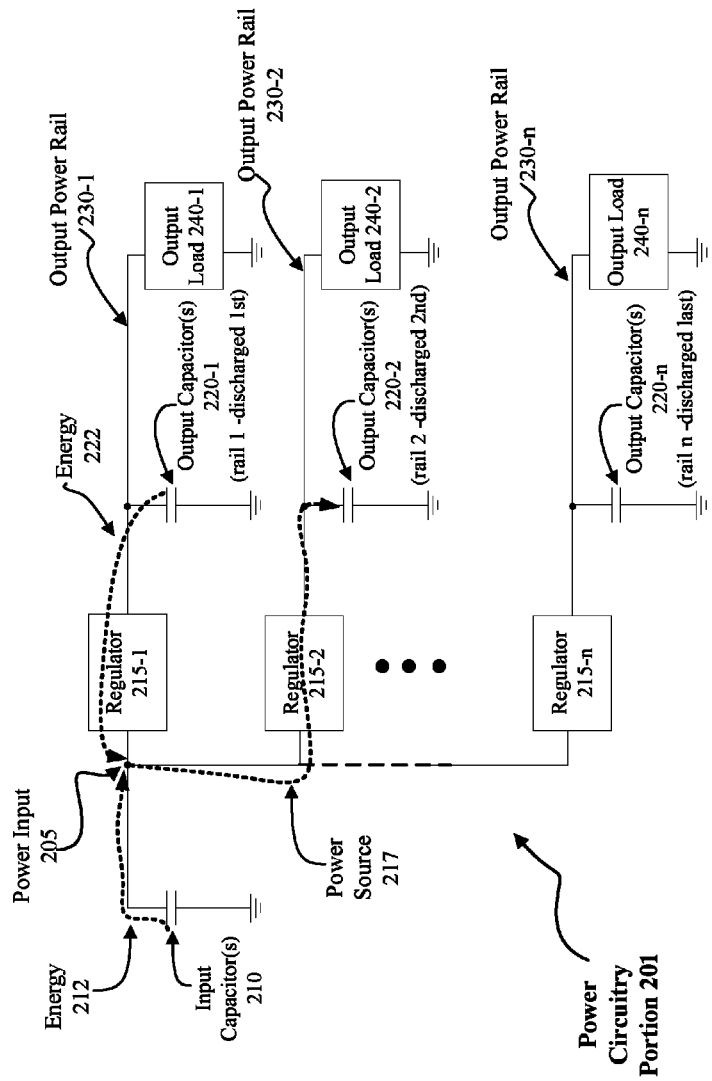
FIG. 2 illustrates an example first power down scheme.

FIG. 2 illustrates an example power down scheme 200. In some examples, power down scheme 200 as shown in FIG. 2 depicts a scheme to power down or shut down output power rails for a storage device. For these examples, power down scheme 200 may be implemented by or using components or elements of system 100 shown in FIG. 1 such as logic and/or features of controller 110, power management module 140 such as PLI logic 142, power circuitry 150, non-volatile memory 120 or volatile memory 130. However, power down scheme 200 is not limited to being implemented by or use only these component or elements of system 100.

In some examples, FIG. 2 shows a power circuitry portion 201. Power circuitry portion 201 may be a portion of power circuitry 150 for storage device 101 as shown in FIG. 1. In some examples, although not shown in FIG. 2, a power source may provide operational power to a power input 205 via which a source voltage may be routed to regulators 215-1 to 215-*n* for respective output power rails 230-1 to 230-*n*. Regulators 215-1 to 215-*n* may be arranged to provide regulated voltage to respective output loads 240-1 to 240-*n*. Regulators 215-1 to 215-*n* may include either buck or boost regulators. According to some examples, output loads 240-1 to 240-*n* may be associated with power loads to components of storage device 101 such as non-volatile memory 120 or volatile memory 130.

According to some examples, as shown in FIG. 2, various capacitors may be included in power circuitry portion 201. For example, one or more input capacitor(s) 210 may be located near power input 205 and one or more output capacitor(s) 220-1 to 220-*n* for respective output power rails 230-1 to 230-*n* may be located near respective output loads 240-1 to 240-*n*.

In some examples, input capacitor(s) 210 and/or output capacitor(s) 220-1 to 220-*n* may be able to provide enough energy to serve as a second power source to provide source voltage to regulators of output power rails included in output power rail 230-1. This energy provided through capacitor discharge may be responsive to a detection by PLI logic 142 that a source voltage received from a power source has dropped below a threshold voltage. In other words, power loss from this power source may be imminent. According to some examples, following a ramping down of voltage provided to output load 240-1, PLI logic 142 may cause output capacitor 220-1 of output power rail 230-1 to discharge energy 222 (e.g., current or electrical energy) away from output load 240-1 and through regulator 215-1 to power input 205. Thus, according to power down scheme 200, energy 222 may be in a reverse flow through regulator 215-1 as compared to when energy or power is sourced through power input 205 during normal operation.

According to some examples, PLI logic 142 may also cause input capacitor(s) 210 to discharge energy 212 to power input 205. For these examples, energy 212 and energy 222 may then be combined to be a second power source to provide source voltage to regulator 215-2. The source voltage, for example, may be provided to enable output power rail 230-2 to ramp down voltage provided to output load 240-2.

In some examples, a similar discharging of output capacitor(s) 220-2 may occur that may result in a third power source that possibly includes any remaining energy being discharged from input capacitor(s) 210 or output capacitor(s) 220-1. The third power source may provide source power to another voltage regulator such as regulator 215-*n* for output power rail 230-*n* to enable output power rail 230-*n* to be the last output power rail to ramp down voltage provided to its output load 240-*n*.

Figure 3:
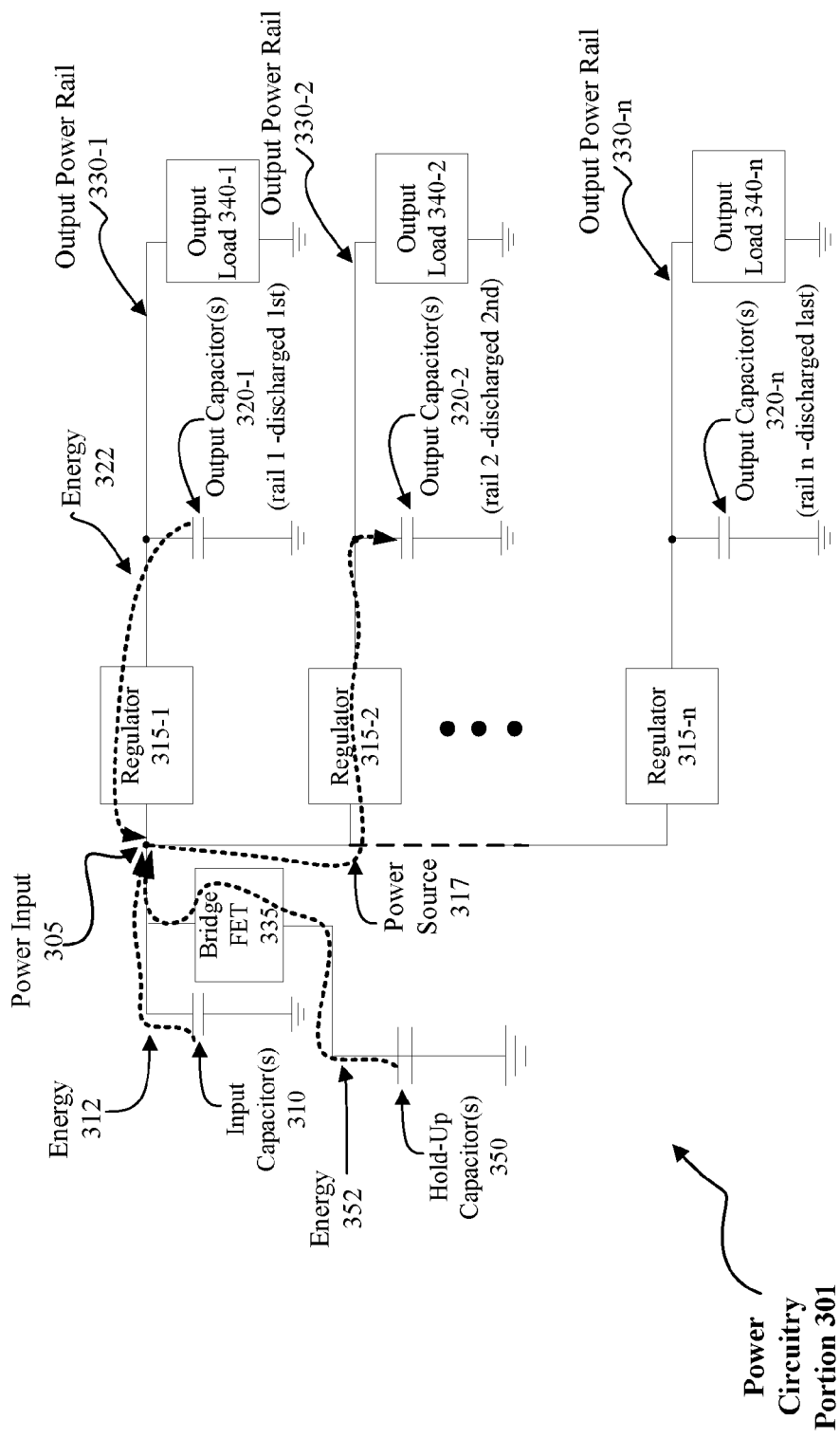
FIG. 3 illustrates an example second power down scheme.

FIG. 3 illustrates an example power down scheme 300. In some examples, power down scheme 300 as shown in FIG. 3 depicts a power scheme to power down or shut down output power rails for a storage device that includes additional circuitry for hold-up capacitor(s) 350. For these examples, power down scheme 300 may be implemented by or using components or elements of system 100 shown in FIG. 1 such as logic and/or features of controller 110, power management module 140 such as PLI logic 142, power circuitry 150, non-volatile memory 120 or volatile memory 130. However, power down scheme 300 is not limited to being implemented by or use only these component or elements of system 100.

In some examples, FIG. 3 shows a power circuitry portion 301 and is similar to power circuitry portion 201 shown in FIG. 2. However, power circuitry portion 301 may include some additional hold-up energy capacity provided by hold-up capacitor(s) 350. For these examples, non-volatile memory 120 may include a combination of types of non-volatile memory such as a combination of NAND and 3-D cross-point memory or may include only NAND that may require the additional hold-up energy capacity. In other words, energy discharged from output and input capacitors may not be sufficient to allow for an orderly power down of storage device 101 that may include this combination of non-volatile memory types or if storage device 101 includes primarily NAND for non-volatile memory 120.

According to some examples, power circuitry portion 201 may be a portion of power circuitry 150 for storage device 101 as shown in FIG. 1. In some examples, although not shown in FIG. 3, a power source may provide operational power to a power input 305 via which a source voltage may be routed to regulators 315-1 to 315-$n$ for respective output power rails 330-1 to 330-$n$. Regulators 315-1 to 315-$n$ may be arranged to provide regulated voltage to respective output loads 340-1 to 340-$n$. Regulators 315-1 to 315-$n$ may include either buck or boost regulators. According to some examples, output loads 340-1 to 340-$n$ may be associated with power loads to components of storage device 101 such as non-volatile memory 120 or volatile memory 130.

In some examples, input capacitor(s) 310, output capacitor(s) 320-1 to 320-$n$ and/or hold-up capacitor(s) 350 may be able to provide enough energy to serve as a second power source to provide source voltage to regulators of output power rails included in output power rails 330-1. This energy provided through capacitor discharge may be responsive to a detection by PLI logic 142 that a source voltage received from a power source has dropped below a threshold voltage. In other words, power loss is imminent for this power source. According to some examples, following a ramping down of power provided to output load 340-1, PLI logic 142 may cause output capacitor 320-1 of output power rail 330-1 to discharge energy 322 (e.g., current or electrical energy) away from output load 340-1 and through regulator 315-1 to power input 305. Thus, according to power down scheme 300, energy 322 may be in a reverse flow through regulator 315-1 as compared to when energy or power is sourced through power input 305 during normal operation.

According to some examples, PLI logic 142 may also cause input capacitor(s) 310 to discharge energy 312 and hold-up capacitor(s) 350 to discharge energy 352 (e.g., current or electrical energy) to power input 305. For these examples, energy 312, energy 352 and energy 322 may then be combined to be a second power source to regulator 315-2. The power source, for example, may be provided to enable output power rail 330-2 to ramp down power provided to output load 340-2.

In some examples, a similar discharging of output capacitor(s) 320-2 may occur that may result in a third power source that possibly includes any remaining energy being discharged from input capacitor(s) 310, hold-up capacitor(s) 350 or output capacitor(s) 320-1. The third power source may provide source voltage to another voltage regulator such as regulator 315-$n$ for output power rail 330-$n$ to enable output power rail 330-$n$ to be the last output power rail to ramp down power provided to its output load 340-$n$.

Figure 4:
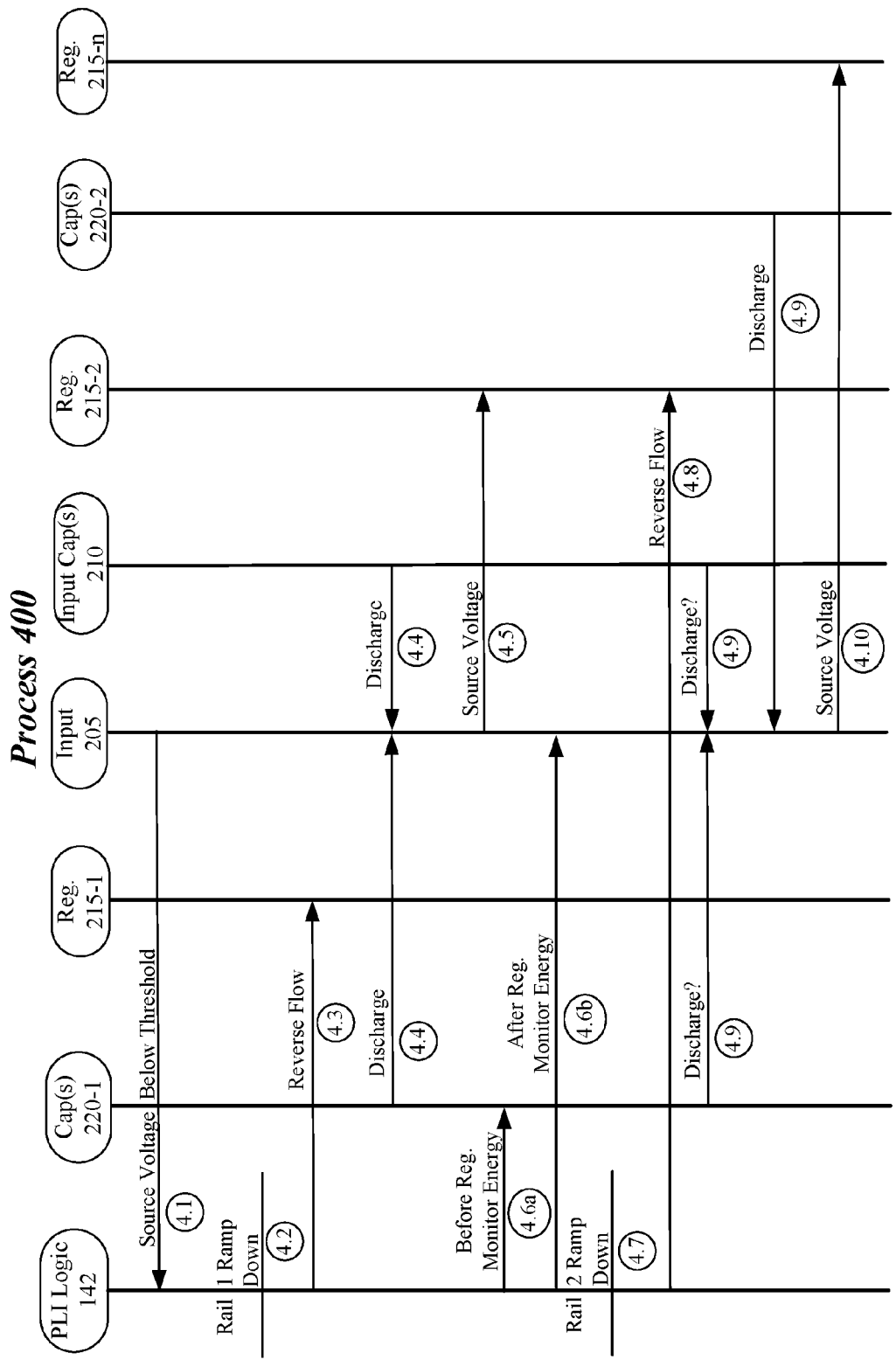
FIG. 4 illustrates an example process.

FIG. 4 illustrates an example process 400. In some examples, process 400 as shown in FIG. 4 depicts a process to power down output power rails for a storage device. For these examples, process 400 may be implemented by or use components or elements of system 100 shown in FIG. 1 such as logic and/or features of controller 110, power management module 140 such as PLI logic 142, power circuitry 150, non-volatile memory 120 or volatile memory 130. Process 400 may also be implemented using power circuitry portions 201 or 301 shown in FIGS. 2-3. However, process 300 is not limited to being implemented by or use only these component or elements of system 100, power circuitry portion 201 or power circuitry portion 301.

Beginning at process 4.1 (Source Voltage Below Threshold), logic and/or features of power management module 140 such as PLI logic 142 may be capable of monitoring a source voltage received from a power source (e.g., battery-based or power outlet-based power source). In some examples, PLI logic 142 may detect that the source voltage has dropped below a first threshold voltage. For example, the source voltage may have dropped below 1.8V or 3.3V.

Moving to process 4.2 (Rail 1 Ramp Down), PLI logic 142 may determine whether output power rail 230-1 has completed providing power to output load 240-1.

Moving to process 4.3 (Reverse Flow), PLI logic 142 may then enable regulator 215-1 to allow energy (e.g., current or electrical energy) to be reversed and flow towards power input 205 as output load 240-1 will be drawing little to no power.

Moving to process 4.4 (Discharge), PLI logic 142 may cause energy 222 coming from output capacitor(s) 220-1 of output power rail 230-1 to be reversed such that energy 222 flows towards power input 205. PLI logic 142 may also cause energy 212 discharged from input capacitor(s) 210 to flow towards power input 205.

Moving to process 4.5 (Source Voltage), PLI logic 142 may cause energy 222 to be combined with energy 212 at power input 205 to enable these energies to be a second power source to provide source power to voltage regulator 215-2 of output power rail 230-2 to enable output power rail 230-2 to ramp down power provided to output load 240-2.

In one alternative, moving to process 4.6$a$ (Monitor Energy Before Reg.), PLI logic 142 may include features to monitor energy 222 being discharged from output capacitor(s) 220-1 before energy 222 passes through regulator 215-1. In some examples, monitoring the voltage resulting from energy 222 before regulator 215-1 may occur to prevent possible damage to regulator 215-1 from a high amount of energy stored up in output capacitor(s) 220-1. The high amount of energy maintained in output capacitor(s) 220-1 may be due to a sometimes bursty nature of some non-volatile memory technologies (e.g., used in SSDs). For these examples, if energy 222 results in a voltage at 251-1 that exceeds a threshold, then PLI logic may activate a resistive discharge of energy 222 to cause energy 222 to fall below the voltage threshold. In other words, the resistive discharge may convert electrical energy 222 to heat energy.

In another alternative, moving to process 4.6$b$ (Monitor Energy After Reg.), PLI logic 142 may include features to monitor the voltage of the energy 212 after being discharged from output capacitor(s) 220-1 and after energy 222 passes through regulator 215-1. For this alternative, regulator 215-1 may have a high enough tolerance to withstand a worst case scenario of energy discharge from output capacitor(s) 220-1. However, input capacitor(s) 210 and/or regulator 215-2 may be damaged by high voltage levels from energy 222. In some examples, if the voltage of energy 212 exceeds a voltage threshold, a controlled load may be activated that is in parallel with input capacitor(s) 210 to cause the voltage of energy 222 to fall below the voltage threshold. In other words, the controlled load may control an amount of energy 222 that is to be converted from electrical energy to heat energy.

In some examples, both process 4.6$a$ and 4.6$b$ may be implemented in a way that has PLI logic 142 monitoring the voltage of energy 222 for a first voltage threshold before regulator 215-1 and also monitoring the voltage of energy 222 for a second voltage threshold after regulator 215-1. This may occur, for example, if regulator 215-1 has a higher tolerance to high levels of voltage associated with the first voltage threshold and thus damaging amounts of voltage to input capacitor(s) 210 and/or regulator 215-2 that may pass through regulator 215-1. For these examples, PLI logic 142 may activate resistive discharge to bring the voltage of energy 222 below the first voltage threshold before regulator 215-1 and may then activate the controlled load to bring the voltage of energy 222 below the second voltage threshold.

Moving to process 4.7 (Rail 2 Ramp Down), PLI logic 142 may determine that output power rail 230-2 has completed providing power for output load 240-2.

Moving to process 4.8 (Reverse Flow), PLI logic 142 may then enable regulator 215-2 to allow energy to be reversed and flow towards power input 205 as output load 240-2 will be drawing little to no power. PLI logic 142 may also maintain the reverse flow on regulator 215-1, provided that output capacitor(s) 220-1 are still discharging energy 222.

Moving to process 4.9 (Discharge), PLI logic 142 may cause energy 222 to continue to flows towards power input 205 (if still discharging). PLI logic 142 may also continue to cause energy 212 to flow towards power input 205 (if still discharging). PLI logic 142 may also cause energy 222 coming from output capacitor(s) 220-1 of output power rail 230-1 to be reversed such that energy discharged from output capacitor(s) 220-2 flows towards power input 205

Moving to process 4.10 (Source Voltage), PLI logic 142 may cause remaining energy discharged from input capacitor(s) 210 and output capacitor(s) 220-1 to be combined with energy discharged from output capacitor(s) 220-2 to be combined at power input 205. These combined energies may be a third power source to provide source power to voltage regulator 215-$n$ of output power rail 230-$n$ to enable a last output power rail 230-$n$ to ramp down power provided to output load 240-$n$.

Figure 5:
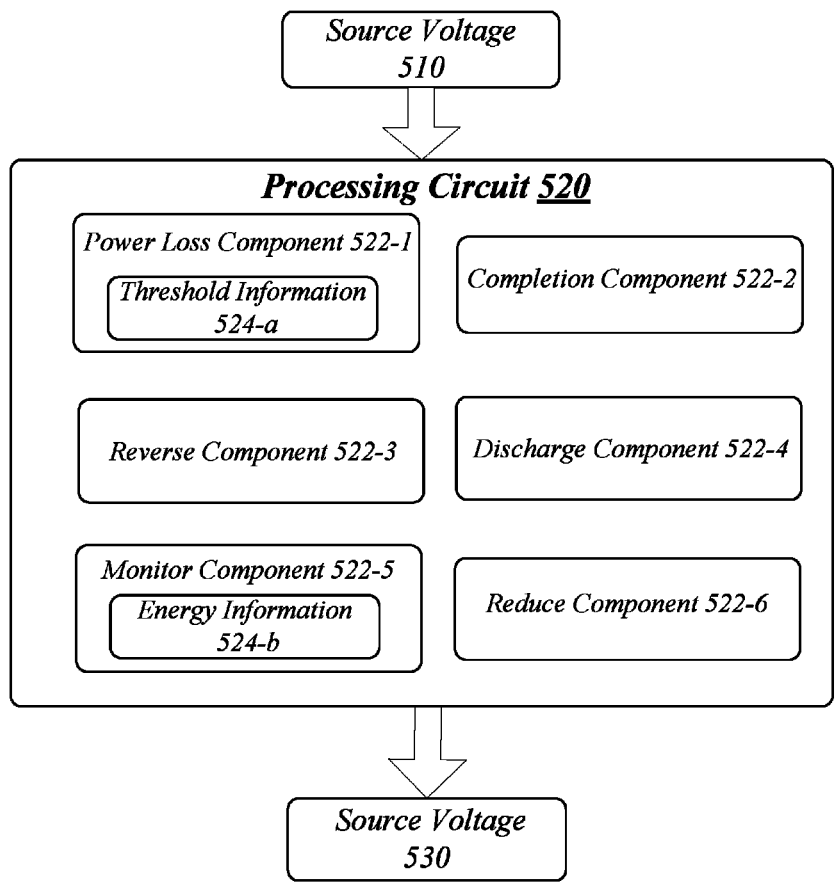
FIG. 5 illustrates an example block diagram for an apparatus.

FIG. 5 illustrates an example block diagram for an apparatus 500. Although apparatus 500 shown in FIG. 5 has a limited number of elements in a certain topology, it may be appreciated that the apparatus 500 may include more or less elements in alternate topologies as desired for a given implementation.

The apparatus 500 may be supported by processing circuit 520 and apparatus 500 may be part of a power management module maintained at a storage device such as power management module 140 for storage device 101 of system 100 shown in FIG. 1. Processing circuit 520 may be arranged to execute one or more software or firmware implemented components or modules 522-$a$ (e.g., implemented, at least in part, by a storage controller of a storage device) that may encompass features of PLI logic 142 mentioned above. It is worthy to note that "a" and "b" and "c" and similar designators as used herein are intended to be variables representing any positive integer. Thus, for example, if an implementation sets a value for a=6, then a complete set of software or firmware for components or modules 522-$a$ may include components 522-1, 522-2, 522-3, 522-4, 522-5 or 522-6. Also, these "components" may be software/firmware stored in computer-readable media, and although the components are shown in FIG. 5 as discrete boxes, this does not limit these components to storage in distinct computer-readable media components (e.g., a separate memory, etc.).

According to some examples, processing circuit 520 may include a processor or processor circuitry. The processor or processor circuitry can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples processing circuit 520 may also include one or more ASICs (e.g., a PMIC) and at least some components 522-$a$ may be implemented as hardware elements of these ASICs.

According to some examples, apparatus 500 may include a power loss component 522-1. Power loss component 522-1 may be a logic and/or feature executed by processing circuit 520 to detect that a source voltage received from a power source has dropped below a first threshold voltage, the power source arranged to provide operational power to the storage device. For these examples, power loss component 522-1 may maintain threshold information 524-$a$ (e.g., in a lookup table (LUT)) that indicates what the source power threshold may be. For examples, 1.8V or 3.3V. Source voltage 510 may represent the source voltage received from the power source.

In some examples, apparatus 500 may also include a completion component 522-2. Completion component 522-2 may be a logic and/or feature executed by processing circuit 520 to determine whether individual output power rails have are no longer needed for operation and can be ramped down.

According to some examples, apparatus 500 may also include a reverse component 522-3. Reverse component 522-3 may be a logic and/or feature executed by processing circuit 520 to cause voltage regulators for respective output power rails to reverse the flow of energy away from their respective output loads. In some examples, reverse component 522-3 may cause each voltage regulator to be reversed in a sequenced order to allow for an orderly power down of output power rails.

In some examples, apparatus 500 may also include a discharge component 522-4. Discharge component 522-4 may be a logic and/or feature executed by processing circuit 520 to cause one or more output capacitors for one or more output power rails to discharge energy away from their respective output capacitors and through respective voltage regulators for their respective output power rails to a power input. In some examples, energy from output capacitors and energy discharging from an input and/or hold-up capacitors may be combined. The combined energy may form an alternative power source to provide source voltage to successive voltage regulators for successive output power rails during an orderly power down. For these examples, the orderly power down may include the output power rails being able to ramp down power provided to their respective output loads using the alternative or auxiliary power source provided by discharging capacitors.

According to some examples, apparatus 500 may also include a monitor component 522-5. Monitor component 522-5 may be a logic and/or feature executed by processing circuit 520 to monitor energy being discharged from input, output or even hold-up capacitors. In some examples, monitor component 522-5 may maintain energy information 524-$b$ (e.g., in a LUT) to determine at what voltage threshold an action may be taken to prevent damage to circuitry elements such as input capacitors or voltage regulators due to possibly high amounts of energy discharged by at least some capacitors. According to some examples, monitor component 522-5 may monitor energy levels either before voltage regulators for output power rails or after these voltage regulators.

In some examples, apparatus 500 may also include a reduce component 522-6. Reduce component 522-6 may be a logic and/or feature executed by processing circuit 520 to reduce energy being discharged towards a voltage regulator and/or towards a power input. In some examples, reduce component 522-6 may activate a resistive discharge (e.g., controlled resistance) to cause energy to be discharged to fall below a voltage threshold. The resistive discharge may occur before or after energy flows through a voltage regulator. In some other examples, reduce component 522-6 may activate a controlled load in parallel with an input capacitor to cause energy flows to a power input to fall below a voltage threshold. Examples are not limited to resistive discharge or a parallel, controlled load, other ways to reduce energy are contemplated.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates an example of a logic flow 600. Logic flow 600 may be representative of some or all of the operations executed by one or more logic, features, or devices described herein, such as apparatus 600. More particularly, logic flow 600 may be implemented by one or more of power loss component 522-1, completion component 522-2, reverse component 522-3 or discharge component 522-4.

According to some examples, logic flow 600 at block 602 may detect at a processing circuit that a source voltage received from a power source arranged to provide operational power to a storage device has dropped below a threshold voltage. For these examples, power loss component 522-1 may detect that the source voltage dropped below the threshold voltage In some examples, logic flow 600 at block 604 may cause a first output capacitor for a first output power rail of the storage device to discharge a first energy away from a first output load and through a first voltage regulator for the first output power rail to a power input for the first output power rail and one or more other output power rails including a second output power rail. For these examples, reverse component 522-3 may enable the first voltage regular to allow for the reverse flow of energy that causes the discharged energy from the first output capacitor to flow towards the power input.

According to some examples, logic flow 600 at block 606 may combine the first energy and a second energy discharging from an input capacitor for the power input, the combined first and second energy to serve as a second power source to provide source voltage to a second voltage regulator for the second output power rail to enable the second output power rail to ramp down power provided to a second output load. For these examples, discharge component 522-4 may combine the first and second energies to serve as the second power source. The combined energy may also be used to power the power circuitry 150.

Figure 7:
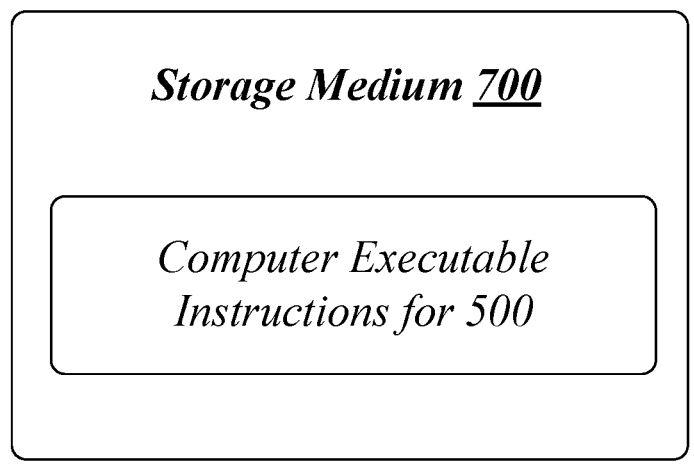
FIG. 7 illustrates an example of a storage medium.

FIG. 7 illustrates an example of a first storage medium. As shown in FIG. 7, the first storage medium includes a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
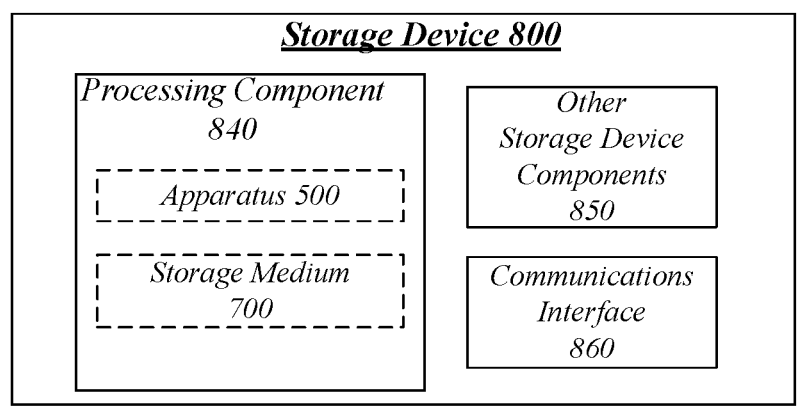
FIG. 8 illustrates an example storage device.

FIG. 8 illustrates an example storage device 800. In some examples, as shown in FIG. 8, storage device 800 may include a processing component 840, other storage device components 850 or a communications interface 860. According to some examples, storage device 800 may be capable of being coupled to a host computing device or platform.

According to some examples, processing component 840 may execute processing operations or logic for apparatus 700 and/or storage medium 700. Processing component 840 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASIC, programmable logic devices (PLD), digital signal processors (DSP), FPGA/programmable logic, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other storage device components 850 may include common computing elements or circuitry, such as one or more processors, multi-core processors, co-processors, memory units, chipsets, controllers, interfaces, oscillators, timing devices, power supplies, and so forth. Examples of memory units may include without limitation various types of computer readable and/or machine readable storage media in the form of one or more higher speed memory units, such as read-only memory (ROM), RAM, DRAM, DDR DRAM, synchronous DRAM (SDRAM), DDR SDRAM, SRAM, programmable ROM (PROM), EPROM, EEPROM, flash memory, ferroelectric memory, SONOS memory, polymer memory such as ferroelectric polymer memory, nanowire, FeTRAM or FeRAM, ovonic memory, phase change memory, memristers, STT-MRAM, magnetic or optical cards, and any other type of storage media suitable for storing information.

In some examples, communications interface 860 may include logic and/or features to support a communication interface. For these examples, communications interface 860 may include one or more communication interfaces that operate according to various communication protocols or standards to communicate over direct or network communication links. Direct communications may occur via use of communication protocols such as SMBus, PCIe, NVMe, QPI, SATA, SAS or USB communication protocols. Network communications may occur via use of communication protocols such as Ethernet, Infiniband, SATA or SAS communication protocols.

Storage device 800 may be arranged as an SSD that may be configured as described above for storage device 101 of system 100 as shown in FIG. 1. Accordingly, functions and/or specific configurations of storage device 800 described herein, may be included or omitted in various embodiments of storage device 800, as suitably desired.

The components and features of storage device 800 may be implemented using any combination of discrete circuitry, ASICs, logic gates and/or single chip architectures. Further, the features of storage device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example storage device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include PLI logic for a storage device, at least a portion of the PLI logic in hardware. For these examples, the PLI logic may detect that a source voltage received from a power source has dropped below a threshold voltage, the power source arranged to provide operational power to the storage device. The PLI logic may also cause a first output capacitor for a first output power rail of the storage device to discharge a first energy away from the first output capacitor and through a first voltage regulator for the first output power rail to a power input for the first output power rail and one or more other output power rails including a second output power rail. The PLI logic may also cause the first energy and a second energy discharging from an input capacitor for the power input to be a second power source to provide source power to a second voltage regulator for the second output power rail to enable the second output power rail to provide power or to ramp down power provided to a second output load.

Example 2

The apparatus of example 1, the PLI logic may also monitor the voltage resulting from the first energy during discharge of the first output capacitor. The PLI logic may also cause the voltage of the first energy to be reduced based on whether the voltage of the first energy exceeds a voltage threshold.

Example 3

The apparatus of example 2, the PLI logic to reduce the voltage of the first energy may include the PLI logic to activate a controlled load in parallel with the input capacitor to cause the voltage of the first energy to fall below the voltage threshold.

Example 4

The apparatus of example 2, the PLI logic to reduce the voltage of the first energy to the lower voltage may include the PLI logic to activate a resistive discharge of the first energy before the first energy passes through the first voltage regulator to cause the voltage of the first energy to fall below the voltage threshold.

Example 5

The apparatus of example 2, the PLI logic to reduce the voltage of the first energy to the lower voltage may include the PLI logic to activate a resistive discharge of the first energy after the first energy passes through the first voltage regulator to cause the voltage of the first energy to fall below the voltage threshold.

Example 6

The apparatus of example 2, the voltage threshold may be based on a voltage rating for the first regulator, the second regulator or the input capacitor. For this example, the voltage rating may be based on a voltage tolerance level set to prevent damage to the first regulator, the second regulator or the input capacitor if the voltage threshold is exceeded.

Example 7

The apparatus of example 1, the PLI logic may detect that the second output power rail has completed operation and can be powered down. The PLI logic may also cause a second output capacitor for the second output power rail to discharge an energy away from the second output capacitor and through the second voltage regulator for the second output power rail to the power input. The PLI logic may also cause the first energy, the second energy and the fourth energy to be a third power source to provide source voltage to a third voltage regulator for a third output power rail to enable the third output power rail to ramp down power provided to a third output load.

Example 8

The apparatus of example 1, the PLI logic may also cause a holdup capacitor to discharge a fourth energy to the power input. The PLI logic may also add the fourth energy to the power input to provide the additional power to the second power source.

Example 9

The apparatus of example 1, the storage device may be a solid state drive including one or more non-volatile memory devices comprising at least one of a 3-dimensional cross-point memory, a memory that uses chalcogenide phase change material, a flash memory, a ferroelectric memory, a silicon-oxide-nitride-oxide-silicon (SONOS) memory, a polymer memory, ferroelectric polymer memory, ferroelectric transistor random access memory (FeTRAM or FeRAM), an ovonic memory, a nanowire, an electrically erasable programmable read-only memory (EEPROM), a phase change memory, memristors or a spin transfer torque-magnetoresistive random access memory (STT-MRAM).

Example 10

An example method may include detecting, at a processing circuit, that a source voltage received from a power source arranged to provide operational power to a storage device has dropped below a threshold voltage. The method may also include causing a first output capacitor for a first output power rail of the storage device to discharge a first energy away from a first output capacitor and through a first voltage regulator for the first output power rail to a power input for the first output power rail and one or more other output power rails including a second output power rail. The method may also include combining the first energy and a second energy discharging from an input capacitor for the power input, the combined first and second energy to serve as a second power source to provide source power to a second voltage regulator for the second output power rail to enable the second output power rail to provide power or to ramp down power provided to a second output load.

Example 11

The method of example 10 may also include monitoring the voltage of the first energy during discharge of the first output capacitor. The method may also include reducing the first energy based on whether the voltage of the first energy exceeds a voltage threshold.

Example 12

The method of example 11, reducing the first voltage may include activating a controlled load in parallel with the input capacitor to cause the first energy to fall below the voltage threshold.

Example 13

The method of example 11, reducing the voltage of the first energy to the lower voltage may include activating a resistive discharge of the first energy before the first energy passes through the first voltage regulator to cause the voltage of the first energy to fall below the voltage threshold.

Example 14

The method of example 11, reducing the voltage of the first energy to the lower voltage may include activating a resistive discharge of the first energy after the first energy passes through the first voltage regulator to cause the first energy to fall below the voltage threshold.

Example 15

The method of example 11, the voltage threshold may be based on a voltage rating for the first regulator, the second regulator or the input capacitor. The voltage rating may be based on a voltage tolerance level set to prevent damage to the first regulator, the second regulator or the input capacitor if the voltage threshold is exceeded.

Example 16

The method of example 10 may also include detecting that the second output power rail has completed operation and can be powered down. The method may also include causing a second output capacitor for the second output power rail to discharge an energy away from the second output capacitor and through the second voltage regulator for the second output power rail to the power input. The method may also include combining the first energy, the second energy and the fourth energy, the combine first, second and third energies to serve as a third power source to provide source voltage to a third voltage regulator for a third output power rail to enable the third output power rail to ramp down power provided to a third output load.

Example 17

The method of example 10 may also include causing a holdup capacitor to discharge a fourth energy to the power input and adding the fourth energy to the power input to provide the additional power to the second power source.

Example 18

The method of example 10, the storage device may be a solid state drive including one or more non-volatile memory devices comprising at least one of a 3-dimensional crosspoint memory, a memory that uses chalcogenide phase change material, a flash memory, a ferroelectric memory, a silicon-oxide-nitride-oxide-silicon (SONOS) memory, a polymer memory, ferroelectric polymer memory, ferroelectric transistor random access memory (FeTRAM or FeRAM), an ovonic memory, a nanowire, an electrically erasable programmable read-only memory (EEPROM), a phase change memory, memristors or a spin transfer torque-magnetoresistive random access memory (STT-MRAM).

Example 19

An example at least one machine readable medium may include a plurality of instructions that in response to being executed by a system cause the system to carry out a method according to any one of examples 10 to 18.

Example 20

An example apparatus may include means for performing the methods of any one of examples 10 to 18.

Example 21

An example system may include one or more memory devices. The system may also include a power management module to manage power provided to the one or more memory devices. The power management module may include a PLI logic, at least a portion of the PLI logic in hardware, the PLI logic may detect that a source voltage received from a power source has dropped below a threshold voltage, the power source arranged to provide operational power to the one or more memory devices. The PLI logic may also cause a first output capacitor for a first output power rail of the one or more memory devices to discharge a first energy away from a first output load and through a first voltage regulator for the first output power rail to a power input for the first output power rail and one or more other output power rails including a second output power rail. The PLI logic may also cause the first energy and a second energy discharging from an input capacitor for the power input to be a second power source to provide source voltage to a second voltage regulator for the second output power rail to enable the second output power rail to provide power or to ramp down power provided to a second output load.

Example 22

The system of example 21, the PLI logic may also monitor the voltage of the first energy during discharge of the first output capacitor. The PLI logic may also cause the voltage of the first energy to be reduced based on whether the first energy exceeds a voltage threshold.

Example 23

The system of example 22, the PLI logic to reduce the first energy may include the PLI logic to activate a controlled load in parallel with the input capacitor to cause the voltage of the first energy to fall below the voltage threshold.

Example 24

The system of example 19, the PLI logic to reduce the voltage of the first energy to the lower voltage may include the PLI logic to activate a resistive discharge of the first energy before the first energy passes through the first voltage regulator to cause the voltage of the first energy to fall below the voltage threshold.

Example 25

The system of example 19, the PLI logic to reduce the voltage of the first energy to the lower voltage may include the PLI logic to activate a resistive discharge of the first energy after the first energy passes through the first voltage regulator to cause the voltage of the first energy to fall below the voltage threshold.

Example 26

The system of example 22, the voltage threshold may be based on a voltage rating for the first regulator, the second regulator or the input capacitor, the voltage rating based on a voltage tolerance level set to prevent damage to the first regulator, the second regulator or the input capacitor if the voltage threshold is exceeded.

Example 27

The system of example 21, the PLI logic may detect that the second output power rail has completed operation and can be powered down. The PLI logic may also cause a second output capacitor for the second output power rail to discharge an energy away from the second output capacitor and through the second voltage regulator for the second output power rail to the power input. The PLI logic may also cause the first energy, the second energy and the fourth energy to be a third power source to provide source voltage to a third voltage regulator for a third output power rail to enable the third output power rail to ramp down power provided to a third output load.

Example 28

The system of example 21, the PLI logic may also cause a holdup capacitor to discharge a fourth energy to the power input. The PLI logic may also add the fourth energy to the power input to provide the additional power to the second power source.

Example 29

The system of example 21 may be a solid state drive, the one or more non-volatile memory devices may include at least one of a 3-dimensional cross-point memory, a memory that uses chalcogenide phase change material, a flash memory, a ferroelectric memory, a silicon-oxide-nitride-oxide-silicon (SONOS) memory, a polymer memory, ferroelectric polymer memory, ferroelectric transistor random access memory (FeTRAM or FeRAM), an ovonic memory, a nanowire, an electrically erasable programmable read-only memory (EEPROM), a phase change memory, memristors or a spin transfer torque-magnetoresistive random access memory (STT-MRAM).

Example 30

The system of example 21 may also include one or more one or more processors communicatively coupled to the one or more memory devices, a network interface communicatively coupled to the system, a battery coupled to the system or a display communicatively coupled to the system.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    power loss imminent (PLI) logic for a storage device, at least a portion of the PLI logic in hardware, the PLI logic to:
    detect that a source voltage received from a power source has dropped below a threshold voltage, the power source arranged to provide operational power to the storage device;
    cause a first output capacitor for a first output power rail of the storage device to discharge a first energy away from a first output capacitor and through a first voltage regulator for the first output power rail to a power input for the first output power rail and one or more other output power rails including a second output power rail; and
    cause the first energy and a second energy discharging from an input capacitor for the power input to be a second power source to provide source power to a second voltage regulator for the second output power rail to enable the second output power rail to ramp down power provided to a second output load.

2. The apparatus of claim 1, comprising the PLI logic to:
    monitor a voltage resulting from the first energy during discharge of the first output capacitor; and
    cause the voltage of the first energy to be reduced based on whether the voltage of the first energy exceeds a voltage threshold.

3. The apparatus of claim 2, the PLI logic to reduce the voltage of the first energy comprises the PLI logic to:
    activate a controlled load in parallel with the input capacitor to cause the voltage of the first energy to fall below the voltage threshold.

4. The apparatus of claim 2, the PLI logic to reduce the voltage of the first energy to a lower voltage comprises the PLI logic to:
    activate a resistive discharge of the first energy before the first energy passes through the first voltage regulator to cause the voltage of the first energy to fall below the voltage threshold.

5. The apparatus of claim 2, the PLI logic to reduce the voltage of the first energy to a lower voltage comprises the PLI logic to:
    activate a resistive discharge of the first energy after the first energy passes through the first voltage regulator to cause the voltage of the first energy to fall below the voltage threshold.

6. The apparatus of claim 2, comprising the voltage threshold based on a voltage rating for the first voltage regulator, the second voltage regulator or the input capacitor, the voltage rating based on a voltage tolerance level set to prevent damage to the first voltage regulator, the second voltage regulator or the input capacitor if the voltage threshold is exceeded.

7. The apparatus of claim 1, comprising the PLI logic to:
detect that the second output power rail has completed operation and can be powered down;
cause a second output capacitor for the second output power rail to discharge a third energy away from the second output capacitor and through the second voltage regulator for the second output power rail to the power input; and
cause the first energy, the second energy and the third energy to be a third power source to provide source voltage to a third voltage regulator for a third output power rail to enable the third output power rail to ramp down power provided to a third output load.

8. The apparatus of claim 1, comprising the PLI logic to:
cause a holdup capacitor to discharge a third energy to the power input; and
add the third energy to the power input to provide additional power to the second power source.

9. The apparatus of claim 1, the storage device comprising a solid state drive including one or more non-volatile memory devices comprising at least one of a 3-dimensional cross-point memory, a memory that uses chalcogenide phase change material, a flash memory, a ferroelectric memory, a silicon-oxide-nitride-oxide-silicon (SONOS) memory, a polymer memory, ferroelectric polymer memory, ferroelectric transistor random access memory (FeTRAM or FeRAM), an ovonic memory, a nanowire, an electrically erasable programmable read-only memory (EEPROM), a phase change memory, memristors or a spin transfer torque-magnetoresistive random access memory (STT-MRAM).

10. A method comprising:
detecting, at a processing circuit, that a source voltage received from a power source arranged to provide operational power to a storage device has dropped below a threshold voltage;
causing a first output capacitor for a first output power rail of the storage device to discharge a first energy away from a first output capacitor and through a first voltage regulator for the first output power rail to a power input for the first output power rail and one or more other output power rails including a second output power rail; and
combining the first energy and a second energy discharging from an input capacitor for the power input, the combined first and second energy to serve as a second power source to provide source power to a second voltage regulator for the second output power rail to enable the second output power rail to ramp down power provided to a second output load.

11. The method of claim 10, comprising:
monitoring a voltage of the first energy during discharge of the first output capacitor; and
reducing the first energy based on whether the voltage of the first energy exceeds a voltage threshold.

12. The method of claim 11, reducing the voltage of the first energy comprising:
activating a controlled load in parallel with the input capacitor to cause the first energy to fall below the voltage threshold.

13. The method of claim 11, reducing the voltage of the first energy to a lower voltage comprising:
activating a resistive discharge of the first energy before the first energy passes through the first voltage regulator to cause the voltage of the first energy to fall below the voltage threshold.

14. The method of claim 11, reducing the voltage of the first energy to a lower voltage comprising:
activating a resistive discharge of the first energy after the first energy passes through the first voltage regulator to cause the first energy to fall below the voltage threshold.

15. The method of claim 11, comprising the voltage threshold based on a voltage rating for the first voltage regulator, the second voltage regulator or the input capacitor, the voltage rating based on a voltage tolerance level set to prevent damage to the first voltage regulator, the second voltage regulator or the input capacitor if the voltage threshold is exceeded.

16. The method of claim 10, comprising:
detecting that the second output power rail has completed operation and can be powered down;
causing a second output capacitor for the second output power rail to discharge a third energy away from the second output capacitor and through the second voltage regulator for the second output power rail to the power input; and
combining the first energy, the second energy and the third energy, the combine first, second and third energies to serve as a third power source to provide source voltage to a third voltage regulator for a third output power rail to enable the third output power rail to ramp down power provided to a third output load.

17. The method of claim 10, the storage device comprising a solid state drive including one or more non-volatile memory devices comprising at least one of a 3-dimensional cross-point memory, a memory that uses chalcogenide phase change material, a flash memory, a ferroelectric memory, a silicon-oxide-nitride-oxide-silicon (SONOS) memory, a polymer memory, ferroelectric polymer memory, ferroelectric transistor random access memory (FeTRAM or FeRAM), an ovonic memory, a nanowire, an electrically erasable programmable read-only memory (EEPROM), a phase change memory, memristors or a spin transfer torque-magnetoresistive random access memory (STT-MRAM).

18. A system comprising:
one or more memory devices; and
a power management module to manage power provided to the one or more memory devices, the power management module including a power loss imminent (PLI) logic, at least a portion of the PLI logic in hardware, the PLI logic to:
detect that a source voltage received from a power source has dropped below a threshold voltage, the power source arranged to provide operational power to the one or more memory devices;
cause a first output capacitor for a first output power rail of the one or more memory devices to discharge a first energy away from a first output capacitor and through a first voltage regulator for the first output power rail to a power input for the first output power rail and one or more other output power rails including a second output power rail; and
cause the first energy and a second energy discharging from an input capacitor for the power input to be a second power source to provide source power to a second voltage regulator for the second output power rail to enable the second output power rail to ramp down power provided to a second output load.

19. The system of claim 18, comprising the PLI logic to:
monitor a voltage of the first energy during discharge of the first output capacitor; and
cause the voltage of the first energy to be reduced based on whether the first energy exceeds a voltage threshold.

20. The system of claim 19, the PLI logic to reduce the first energy comprises the PLI logic to:
  activate a controlled load in parallel with the input capacitor to cause the voltage of the first energy to fall below the voltage threshold.

21. The system of claim 19, the PLI logic to reduce the voltage of the first energy to a lower voltage comprises the PLI logic to:
  activate a resistive discharge of the first energy before the first energy passes through the first voltage regulator to cause the voltage of the first energy to fall below the voltage threshold.

22. The system of claim 19, the PLI logic to reduce the voltage of the first energy to a lower voltage comprises the PLI logic to:
  activate a resistive discharge of the first energy after the first energy passes through the first voltage regulator to cause the voltage of the first energy to fall below the voltage threshold.

23. The system of claim 18, comprising the PLI logic to:
  detect that the second output power rail has completed operation and can be powered down;
  cause a second output capacitor for the second output power rail to discharge a third energy away from the second output capacitor and through the second voltage regulator for the second output power rail to the power input; and
cause the first energy, the second energy and the third energy to be a third power source to provide source voltage to a third voltage regulator for a third output power rail to enable the third output power rail to ramp down power provided to a third output load.

24. The system of claim 18, comprising the PLI logic to:
  cause a holdup capacitor to discharge a third energy to the power input; and
  add the third energy to the power input to provide additional power to the second power source.

25. The system of claim 18, comprising a solid state drive, the one or more memory devices comprising at least one of a 3-dimensional cross-point memory, a memory that uses chalcogenide phase change material, a flash memory, a ferroelectric memory, a silicon-oxide-nitride-oxide-silicon (SONOS) memory, a polymer memory, ferroelectric polymer memory, ferroelectric transistor random access memory (FeTRAM or FeRAM), an ovonic memory, a nanowire, an electrically erasable programmable read-only memory (EEPROM), a phase change memory, memristors or a spin transfer torque-magnetoresistive random access memory (STT-MRAM).

26. The system of claim 18, comprising one or more of:
  one or more processors communicatively coupled to the one or more memory devices;
  a network interface communicatively coupled to the system;
  a battery coupled to the system; or
  a display communicatively coupled to the system.

* * * * *